United States Patent
Minhas et al.

(10) Patent No.: US 7,976,710 B2
(45) Date of Patent: Jul. 12, 2011

(54) MEMBRANE AND PROCESS FOR THE RECOVERY OF ACID

(75) Inventors: Bhupender S. Minhas, Bridgewater, NJ (US); Ramon A. Strauss, Herndon, VA (US); Tomas R. Melli, Haymarket, VA (US); John H. Hollenbach, Vienna, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 797 days.

(21) Appl. No.: 11/369,613

(22) Filed: Mar. 7, 2006

(65) Prior Publication Data

US 2006/0144792 A1    Jul. 6, 2006

Related U.S. Application Data

(63) Continuation-in-part of application No. 10/947,019, filed on Sep. 22, 2004, now abandoned, which is a continuation-in-part of application No. 10/773,789, filed on Feb. 6, 2004, now abandoned.

(60) Provisional application No. 60/448,270, filed on Feb. 18, 2003.

(51) Int. Cl.
*B01D 71/38* (2006.01)
*B01D 61/02* (2006.01)
*B01D 69/02* (2006.01)
*B01D 71/32* (2006.01)

(52) U.S. Cl. ..... 210/652; 210/640; 210/650; 210/321.6; 210/500.42; 210/500.36

(58) Field of Classification Search ............... None
See application file for complete search history.

(56) References Cited

U.S. PATENT DOCUMENTS

| | | | |
|---|---|---|---|
| 2,276,210 A | 3/1942 | Lane et al. | |
| 3,275,575 A | 9/1966 | Fogle | |
| 3,333,019 A | 7/1967 | Nathan et al. | |
| 3,462,362 A * | 8/1969 | Kollsman | 210/636 |
| 3,963,567 A | 6/1976 | Cole | |
| 4,012,324 A * | 3/1977 | Gregor | 210/500.37 |
| 4,071,454 A | 1/1978 | Yamamoto et al. | |
| 4,767,645 A | 8/1988 | Linder et al. | |
| 4,833,014 A | 5/1989 | Linder et al. | |
| 4,876,403 A * | 10/1989 | Cohen et al. | 568/913 |
| 4,960,517 A * | 10/1990 | Cadotte | 210/639 |
| 5,565,102 A | 10/1996 | Brandt et al. | |
| 5,976,324 A * | 11/1999 | Groschl et al. | 203/14 |
| 6,159,382 A * | 12/2000 | Conant et al. | 210/712 |
| 6,183,642 B1 | 2/2001 | Heijnen et al. | |

(Continued)

FOREIGN PATENT DOCUMENTS

EP    0 352 798 A2    7/1989

(Continued)

OTHER PUBLICATIONS

William Y. Hsu, Timothy D. Gierke; "Ion Transport and Clustering in Nafion Perfluorinated Membranes," Journal of Membrane Science, 13 (1983) pp. 307-326.

(Continued)

*Primary Examiner* — Krishnan S Menon (57) ABSTRACT

A cross-linked polyvinyl sulfate, copolymer of polyvinyl sulfate and polyvinyl alcohol, or Nafion® membrane is used for recovering sulfuric acid from a feed mixture comprising predominantly acid and water under reverse osmosis conditions wherein sulfuric acid is enriched in the retentate stream and water is removed in the permeate stream.

6 Claims, 5 Drawing Sheets

U.S. PATENT DOCUMENTS

| | | |
|---|---|---|
| 6,183,648 B1 | 2/2001 | Kozak et al. |
| 6,610,268 B1 * | 8/2003 | Young et al. .................. 423/522 |
| 2004/0222157 A1 | 11/2004 | Minhas et al. |
| 2005/0173345 A1 | 8/2005 | Minhas et al. |

FOREIGN PATENT DOCUMENTS

| | | |
|---|---|---|
| EP | 0 307 636 B1 | 12/1991 |
| JP | 05-301034 | 11/1993 |
| JP | 07-265864 | 10/1995 |
| JP | 10-132241 | 5/1998 |
| WO | WO 88/05769 | 8/1988 |
| WO | WO 98/43716 | 10/1998 |
| WO | WO 99/50177 | 10/1999 |
| WO | WO 01/89654 A2 | 11/2001 |
| WO | WO 2004/074811 A2 | 9/2004 |

OTHER PUBLICATIONS

Jia Zhiqian, Zhu Changqing, Zhang Qun, Liu Huijuan, Liu Zhongzhou, Qu Jiuhui, Fu Dianpo; "Comprehensive utilization of acidic wastewater from 3,3'-dichlorobenzidine hydrochloride manufacture," J. Chem. Technol. Biotechnol 76, pp. 1085-1090.

Richard W.Baker; Book—Membrane Technology and Applications, Second Edition, Chapter 5—Reverse Osmosis; John Wiley & Sons, Ltd., 2004, pp. 191-235.

* cited by examiner

MEMBRANE AND PROCESS FOR THE RECOVERY OF ACID

This is a Continuation-in-Part of U.S. Ser. No. 10/947,019 filed Sep. 22, 2004 (abandoned), which is a Continuation-in-Part of U.S. Ser. No. 10/773,789 filed Feb. 6, 2004 (abandoned) of Provisional Application 60/448,270 filed Feb. 18, 2003.

FIELD OF THE INVENTION

The present invention relates generally to polymeric membranes for separating acid from water. More particularly, it relates to particularly adapted polymeric membranes and their use in separating and recovering acids, including sulfuric acid.

BACKGROUND OF THE INVENTION

Numerous industrial processes use acids in their processing that dilute or contaminate the acid with water. These contaminated acids are commonly referred to as "spent acid". Industrial chemical and petroleum processes are prime examples. Many of these processes require purification or regeneration of the process acid to remove impurities, and reconstitute the acid which often require costly processing. Handling spent acid also raises safety and environmental concerns. Accordingly, there is ample need for a separation process to efficiently and effectively reconstitute the acid and, where needed, remove impurities from process contaminated acids, to restore the acid to or near its original process specification. It would also be beneficial if that process could be deployed "in situ" with the process that produced the spent acid. The present invention is directed to a polymeric membrane that is suitable for use in regenerating process acids. The polymeric membrane withstands the acid environment and preferentially diffuses the water over the retentate acid. The process can be used "in-situ" with common chemical petroleum and petrochemical processes. Though particularly described hereinafter in relation to use in a petroleum processing stream, the polymeric membrane has application to varied acid/water separations.

Acids are widely used in industrial chemical and petroleum refining applications that require acid "regeneration," which generally means removal of water from the spent acid to restore the acid to, or near to, its original process specification or requirements. An exemplary acid use to illustrate the present invention is sulfuric acid, which is used in a number of chemical, petrochemical and petroleum refining processes.

Sulfuric acid is widely used in industrial chemical and petroleum refining processes. Depending on the use, commercial "fresh" acid is typically supplied in strengths of 70-99.5 wt % sulfuric acid with the remainder typically being water. Many uses generate a waste or spent acid stream containing a higher percentage of water. This spent acid stream is typically reprocessed to remove the water. Incineration and reconstitution of the sulfuric acid is conventionally used to remove the water and other contaminant organic material.

Conventional methods for spent acid regeneration involve generally combustion of the spent acid to form sulfur dioxide, conversion of the sulfur dioxide to sulfur trioxide, and absorption of the sulfur trioxide in water. While this technology is widely used to produce high strength acid (>98 wt % $H_2SO_4$), it is capital intensive. Thus, it is usually more economical for low volume users of sulfuric acid to transfer spent sulfuric acid by various means such as rail, truck, ship, or pipeline to a central regeneration facility rather than construct their own facilities for acid regeneration. Freight costs can be a significant part of the total costs for regenerating spent acid.

Sulfuric acid can also be regenerated from about 70 wt % $H_2SO_4$ to about 85 wt % or about 96 wt % sulfuric acid by using evaporation with one or two stages. The evaporation method is highly energy intensive as the acid/water mixture must be heated to a high temperature to vaporize the water. It also requires special materials such as glass lined vessels and tantalum heaters to prevent corrosion. An improved, less expensive method for regenerating spent sulfuric acid is needed, preferably a method that may be employed in situ.

SUMMARY OF THE INVENTION

The present invention, relates generally to an improved polymeric membrane and its use in regenerating spent acid. One embodiment of the present invention relates to particularly adapted polymer membranes that are capable of withstanding an acid environment and their use in a method for recovering an acid such as sulfuric acid from a feed mixture comprising predominantly acid and water. The method comprises processing the acid/water mixture using a polymeric membrane to form a first retentate containing a substantially greater concentration of acid than the feed mixture and a first permeate containing a substantially greater concentration of water than the feed mixture. In another embodiment, the method comprises processing the first permeate using a second polymeric membrane to form a second retentate containing a substantially greater concentration of acid than the first permeate and a second permeate containing a substantially greater concentration of water than the first permeate, and recovering the first and second retentate. A further embodiment includes processing of the feed, first and/or second retentate to remove other than water contaminants, e.g. organic contaminants.

Yet another aspect of the present invention relates to a combination of reverse osmosis ("RO") membrane separation, combined with pervaporation membrane separation.

DETAILED DESCRIPTION OF THE INVENTION

Membranes and Membrane/Support

The present invention relates generally to polymeric membranes for separating acid from acid-water mixtures. More particularly, it relates to particularly adapted polymeric membranes and their use in separating and recovering acids, including sulfuric acid from acid-water streams. These streams comprise acid and water, and may have any combination of hydrocarbons and/or other organic or inorganic contaminants. The membranes of the present invention comprise polymeric membranes. More particularly, the membrane is a crosslinked polyvinyl alcohol membrane characterized by its crosslink density. Crosslink density as used herein, is defined as percent of available alcohol groups reacted with a crosslinking agent, e.g., 5% crosslinking means that about 5% of the vinyl alcohol groups have been reacted with the chemical cross-linking agent. The membrane crosslink density ranges from about 1.0% to about 25.0%. In a preferred embodiment the crosslink density ranges from about 2.5% to about 20.0%, and most preferably ranges from about 5.0% to about 10.0%. While not fully understood, the crosslink density, as taught herein, produces a membrane that may be adapted to withstand acid environments typically encountered in petroleum processing applications such as sulfuric acid alkylation for example. The degree of crosslinking is also believed to influence the selectivity and flux characteristics of the membrane, in addition to its mechanical and structural stability. The PVA membrane is preferably crosslinked using 1,4 diisocyanatohexane before use in an acid environment. Preferably the membranes are made of crosslinked PVA, PVS and other oxoanion modified PVAs. Other suitable crosslinking agents include 1,4 diisocyanatobutane, 1,8 diisocyanatooctane, 1,12 diisocyanatododecane, 1,5 diisocyanateo-2-methyl pentane, and 4,4' diisocyanato-diphenylmethane. In a preferred embodiment, the crosslinked PVA membrane described above is contacted with a sulfur-containing agent such as sulfuric acid, sufficient to react with the hydroxyl groups of the PVA membrane to form sulfate groups. The crosslinked polymer thereby becomes a polyvinyl sulfate membrane ("PVS"), or a copolymer of vinyl sulfate and vinyl alcohol, ("PVS/PVA"). The PVS and/or PVS/PVA membranes are suitable for membrane application in acid environments, such as sulfuric acid membrane application where acid strength may range from about 70% to about 98 wt % acid. The term "acid environment", when used herein, means a liquid or fluid substance containing about 70% to about 98 wt % acid. In addition to poly(vinyl sulfate), other membrane materials can be poly(vinyl phosphate) and or other vinyl groups which may have affinity to sulfuric acid or an affinity to the particular acid comprising the acid environment.

In addition to the formation of polyvinylsulfate (PVS) from the reaction of polyvinyl alcohol with sulfuric acid, other inorganic oxoanion modified polymer membranes may be used. They include polyvinyl phosphate membranes made from PVA membranes.

In addition to the phosphate, one can also use arsenate, antimonate, or bismuthate to form polyvinyl arsenate, polyvinyl antimonate, and polyvinyl bismuthate, respectively. Calcogenic oxides, such as polyvinyl selenate and polyvinyl telurate, formed from the reaction of selenic and teluric acids with PVA may also be used.

Another suitable membrane is formed by reacting PVA with boric acid.

In alternative embodiments, other polymerized alcohols and their oxoanion modified compounds, referred herein as oxoanion modified polymerized alcohols may be used in the practice of the present invention. Examples of suitable polymerized alcohols include polypropyl alcohol, polybutyl alcohol, and the like. These structures also may include polymerized alcohol copolymers, polymerized terpolymers, oxoanion modified polymerized alcohol copolymers, oxoanion modified polymerized alcohol terpolymers and the like. These also would form the corresponding modified polymers.

Other membranes suitable for use in the present invention comprise perfluorinated ionomer membranes characterized by the presence of active anionic groups. The term "perfluorinated", as used herein, refers to the replacement of hydrogen atoms in an organic compound by fluorine (except where the identity of a functional group would be altered thereby, such as in the case of per-fluoro-1-propanol). As used herein the term "perfluorinated ionomer membrane" refers to an ion-exchange membrane prepared from a perfluorinated ion-exchange polymer.

This class of ion exchange polymers is generally characterized by the presence of anionic groups attached to the polymer chains which are associated with protons and/or metal ions. The former exhibit acidic character while the latter exhibit salt-like character. The anionic groups form a continuous or nearly continuous microphase within the polymer matrix. Examples of active anionic groups are carboxylate, sulfonate, and phosphonate.

The concentration of anionic groups can be expressed in units designated as EW (equivalent weight) which is defined as the mass in grams of the dry polymer in the acid form that would neutralize one equivalent of base. The EW of poly (acrylic acid) is 64, which is the molecular weight of the monomer acrylic acid. The EW of commercially available Nafion®, a perfluorinated copolymer manufactured by DuPont, typically ranges between 950 to 1,800. Additional description of this membrane may be found in W. Y. Hsu and T. C. Giercke, "Ion Transport and Clusters in Nafion® Perfluorinate Membranes," J. Membrane Science, 13 [1983], 307-326.

A preferred membrane for use in the present process is identified in the trade as Nafion®, which is a copolymer of perfluoroethylene and perfluoro-vinylether, the latter component having pendant sulfonic or carboxylic acid groups. The structure of Nafion® is represented as follows, in the case of a sulfonated Nafion® in its acidic form:

where m=5 to 13.5; and n=1,000;
Equivalent Weight (EW) Ranges 950-1,800
Cation Exchange Capacity 1.05-0.55 meq/m Nafion® membranes can be symmetric or asymmetric. Asymmetric Nafion® membranes are comprised of material which is processed so as to produce two membrane sides having different properties such as, for example, a layer of carboxylic acid-containing resin in association with a layer of sulfonic acid-containing resin. More preferred Nafion® membranes are Nafion® 1100 and Nafion® 800 marketed by DuPont, Fluoropolymers, Wilmington, Del.

In a preferred embodiment, the membrane is supported by a secondary membrane such as teflon or Gore-Tex™ for example, having a membrane pore size selected to compliment the pore characteristics of the primary membrane. The secondary membrane may also serve as a suitable substrate for the formation, deposition or coating thereon of the primary membrane.

In separating acid from acid waste streams the flow rate of the feed across the membrane surface should be sufficient to prevent undue selectivity loss by concentration polarization. The flow rate of the feed depends on the particular geometry and configuration of the membrane and any supporting or containment vessel used, as well as on temperature. Generally, higher temperatures, lower flow rates can be tolerated. Establishing the optimum flow rate for a membrane configuration and set of operating conditions can be readily determined by a skilled practitioner.

High flux can be achieved by operating with the thinnest membrane that will maintain its physical integrity under the operating conditions. To help the membrane maintain its physical integrity, a composite membrane may be used. For example, a thin selective polymeric layer (or membrane) may be supported on a non-selective, porous membrane, to produce a laminate structure. The selective membrane layer is preferably securely attached on top of, or coating the surface of, the porous membrane material which constitutes a physical support. The thin polymeric layer may range in thickness from sub-micron to 50 microns, preferably 0.5 microns to 10 microns, most preferably 0.5 microns to 4 microns.

The membranes used in the process of the present invention may be utilized in the form of hollow fibers, tubes, films, sheets, etc. The process may conveniently be carried out in a test cell which is divided into compartments by means of a membrane or membranes. The compartments will each have means for removing the contents therefrom. The process may be carried out continuously or batchwise, but preferably in a continuous manner.

Membrane Separation Systems for Acid Regeneration

In one embodiment, the membrane separation process is a reverse osmosis or nanofiltration process, whereby the dilute acid feed is pressurized. The reverse osmosis process and nanofiltration process are known to those skilled in the art and are described, for example, by Richard W. Baker in Membrane Technology and Applications, Second edition, John Wiley and Sons, Ltd., at pages 191 et seq.

Figure 1:
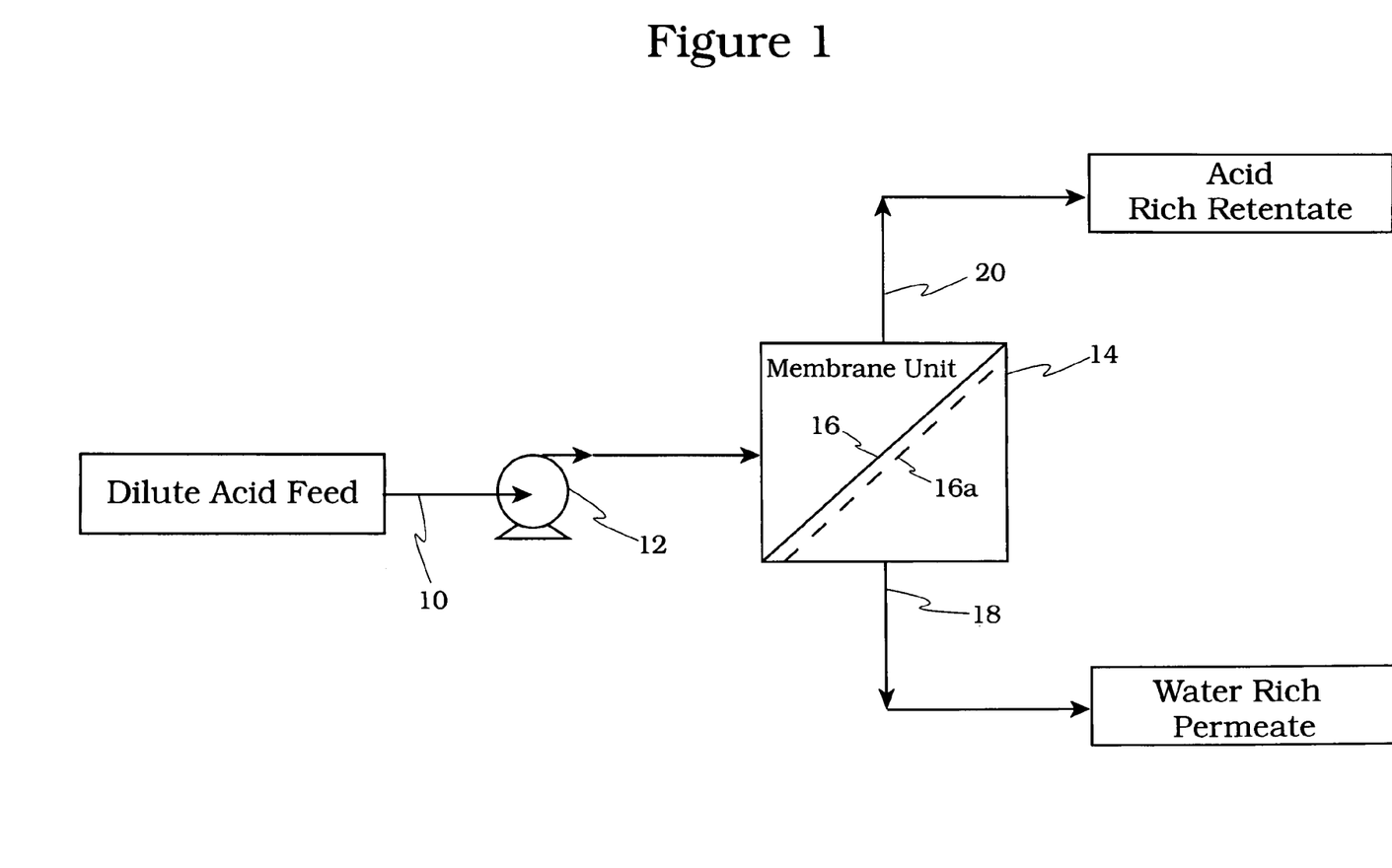
FIGS. 1 to 3 are simplified schematics of different embodiments of the present invention.
Figure 4:
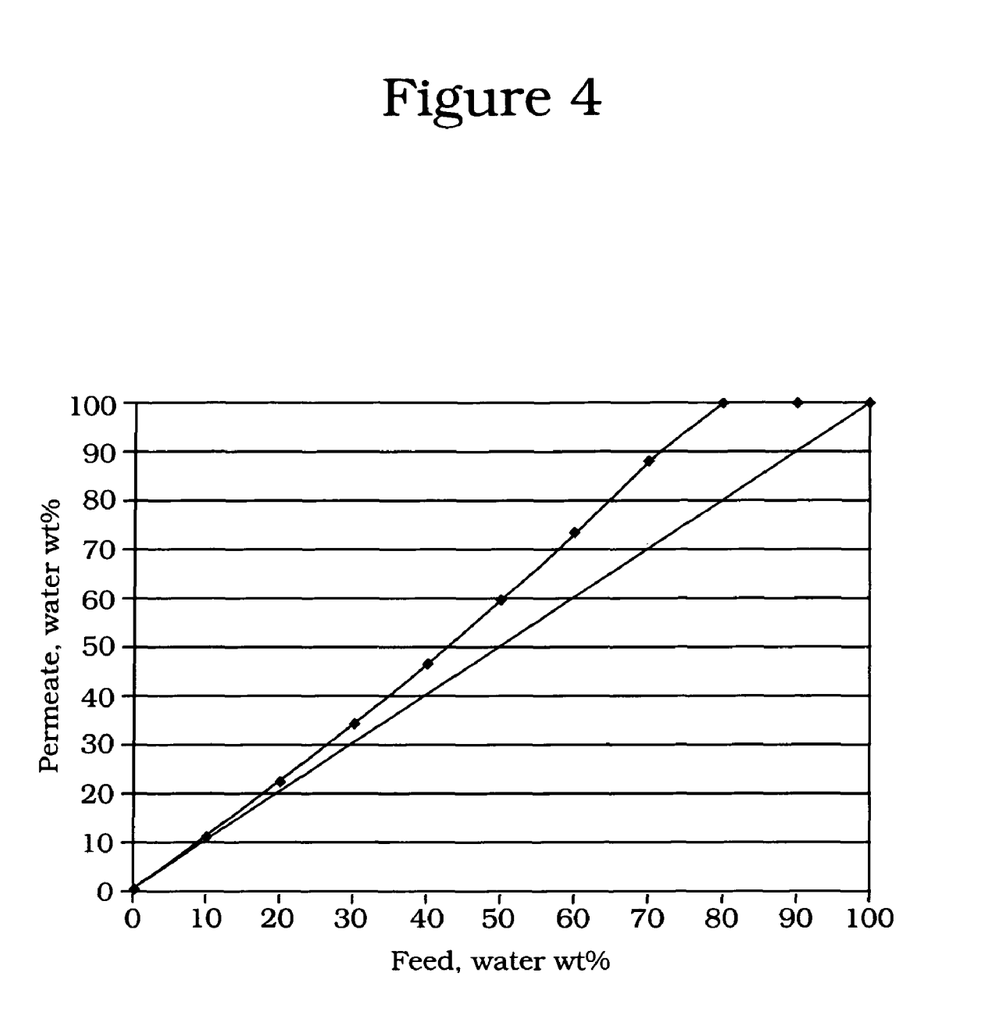
FIG. 4 is a graph of feed vs. permeate for reverse osmosis and/or nanofiltration separation embodiments of the present invention.

Referring to FIG. 1, a dilute acid feed (10) is conveyed and pressurized by pump means (12) to membrane unit (14). In the reverse osmosis ("RO") embodiment, the feed is pressurized between about 100 psi and 5000 psi, preferably 300 psi and 1500 psi, and most preferably 600 psi to 1200 psi. The membrane unit (14) comprises a polymeric membrane (16) that preferentially excludes acids, such a sulfuric acid for example, as described hereinabove. In a preferred embodiment, membrane (16) comprises an acidic feed compatible hydrophilic material such as cross-linked poly(vinyl alcohol), ionic polymer such as Nafion®, for example, cellulose acetate, polysulfone, etc. In a preferred embodiment, membrane (16) is supported by a contiguous support membrane (16a) such as Teflon, for example. Membrane support (16a) may preferably comprise of an acid stable porous material such as polytetrafluoroethylene, polyvinylidene fluoride, etc. Membrane (16) preferentially excludes acid over water, whereby retentate (20) is acid rich and permeate (18) is predominantly water. In the RO and nanofiltration embodiment, the spent or dilute acid feed, excluding contaminants, typically contains less than about 50 wt % acid (i.e. about 50% water), preferably less than about 40 wt % acid (i.e. about 60% water), and most preferably less than about 25 wt % acid (i.e. about 75% water). Referring momentarily to FIG. 4, there is shown a graph of feed water content versus permeate water content for one embodiment. As noted from the graph, in the RO or nanofiltration embodiment, the membrane preferentially excludes acid for feed content of acid less than about 25 wt %. For feed acid content greater than about 25%, acid permeates the membrane in approximately linearly increasing amounts with increasing feed acid content.

Figure 2:
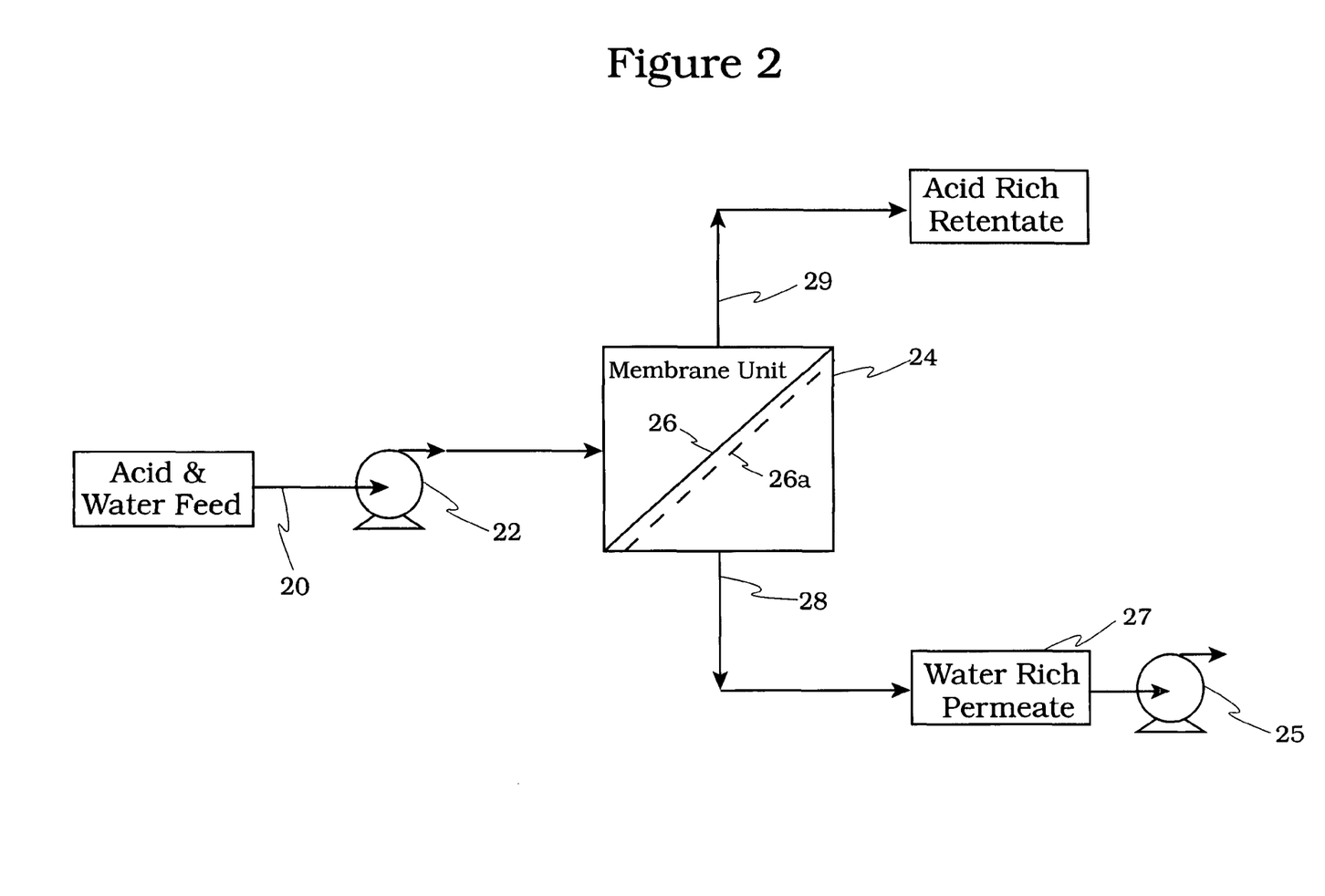

In an alternate embodiment, the membrane system for acid regeneration operates in a pervaporation configuration, illustrated in FIG. 2.

In this embodiment, the feed to a membrane unit is maintained under conditions of pressure such that substantially all of the acid is in liquid phase. The permeate is withdrawn under a vacuum, which is generally maintained in the range of 1 to 50 mm Hg, preferably in the range of 2 mm to 25 mm Hg., and most preferably 5 mm to 15 mm Hg. The permeated phase will be in a vapor phase, and subsequently condensed by cooling in a condenser (not shown). This process is generally known in the art as pervaporation.

In this preferred embodiment, the separation mechanism is understood to be the "solution-diffusion" type. According to this mechanism feed components which have higher solubility in the polymer material get preferentially sorbed and then diffuse through the membrane to the permeate side. Separation is based primarily on sorption and diffusion.

The vacuum on the permeate side of the membrane can affect both selectivity and flux. The selectivity and the flux generally increase as the vacuum pressure on the permeate increases. In yet another embodiment, a sweep gas may be passed across the membrane at a rate sufficient to increase the permeation rate. Suitable sweep gases include carbon dioxide, nitrogen, hydrogen, air, or low boiling hydrocarbons such as methane, ethane or propane. Alternatively, the permeate side of the membrane may be swept by a liquid perstraction solvent in which the permeate is soluble and which is non-corrosive with respect to the membrane, at a rate sufficient to enhance the permeation rate of the permeable component or components through the membrane. Suitable perstraction solvents include alcohols.

Figure 5:
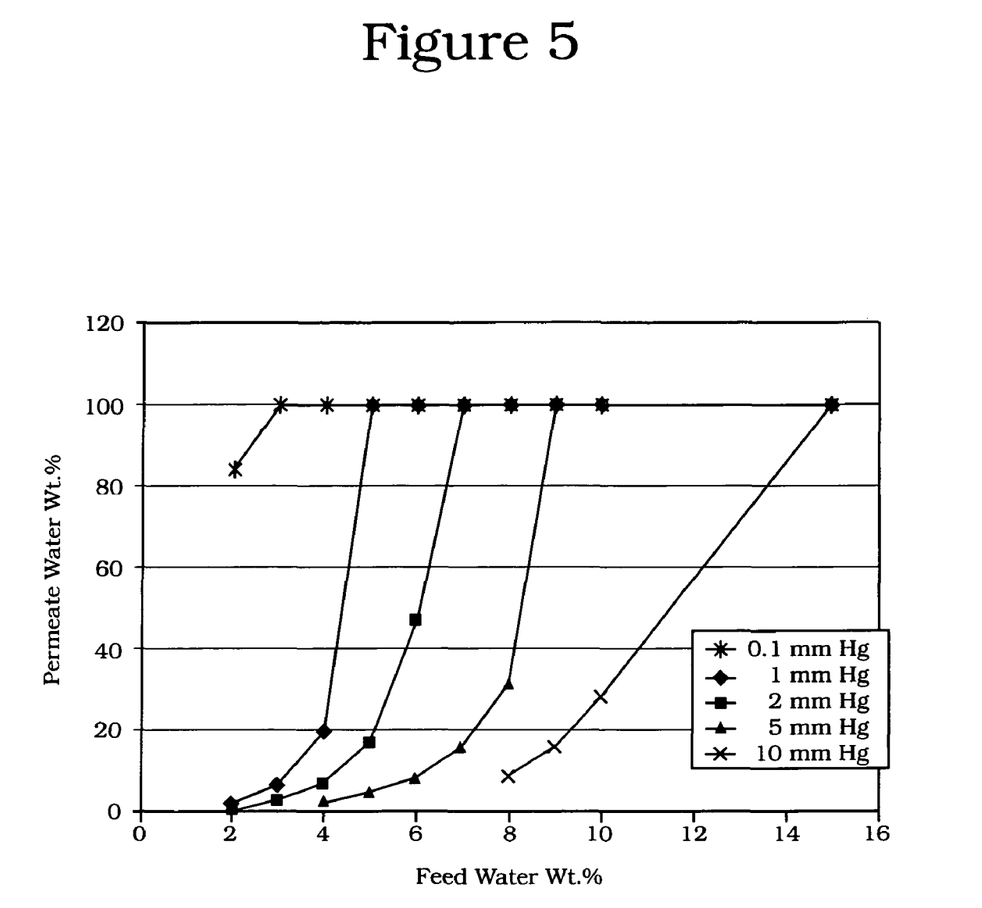
FIG. 5 is a graph of feed vs. permeate for a pervaporation separation embodiment of the present invention.

Referring now to FIG. 2, a spent acid stream (20) such as a spent sulfuric acid stream comprising acid, and predominantly water, is fed via a pump (22) or other means to a membrane unit (24). The membrane unit comprises a polymeric membrane (26) that is selectively permeable to water relative to acid. In a preferred embodiment, membrane (26) comprises an acid feed compatible hydrophilic materials such as cross-linked poly(vinyl alcohol), ionic polymer (Nafion®) and polytetrtafuoroethylene, for example. In a preferred embodiment, membrane (26) is supported by a contiguous support membrane (26a). In a preferred embodiment, membrane support (26a) comprises of an acid stable porous material such as polytetrafluoroethylene, polyvinylidene fluoride, etc. The selectively permeable membrane (26) separates the feed into two products, a first permeate stream (28) and a first retentate stream (29). The first permeate stream (28) has increased water concentration and substantially reduced acid content. The first retentate stream (29) has increased acid content. Referring momentarily to FIG. 5, there is shown a graph of Feed Water content versus Permeate Water content for several exemplary vacuum levels (permeate vacuum) for the embodiment illustrated in FIG. 2. As reflected in this graph, for the embodiment illustrated in FIG. 2, the feed (20) water content ranges from about 3 wt % to about 95 wt %, preferably about 5 wt % to about 80 wt %, and most preferably 10 wt % to about 70 wt %. Vacuum means (25) maintains sufficient vacuum in the permeate side of the membrane to achieve suitable selectivity and flux of the permeate. In a preferred embodiment, the vacuum is maintained in the range of one to about 50 mm. Condenser means (27) functions to condense permeate vapor into liquid which comprises water rich permeate.

To illustrate an application of the invention, a feed that simulates two variants of a spent acid stream was run on a single membrane embodiment as illustrated in FIG. 2. Feed versus permeate data for two different acid feeds is shown in Table 1.

TABLE 1

DATA FOR THE EMBODIMENT OF FIGS. 1 AND 2 Membrane used is Nafion ® 1035 (3.5 mil thick, 1035 EW) - Feed is Acid:Water Solution

| Feed Composition | | | | |
|---|---|---|---|---|
| Acid (wt %) | 7.0 | 8.6 | 5.7 | 5.7 |
| Permeate Composition for FIG. 1 - 70° F. and 700 psig Feed Pressure | | | | |
| Acid (wt %) | | | 2.45 | 2.5 |
| Permeate Composition for FIG. 2 - 70° F. and 10 mmHg Permeate Pressure | | | | |
| Acid (wt %) | 0.004 | 0.03 | | |

The RO embodiment illustrated in FIG. 1 may be combined with the solution diffusion/pervaporation embodiment illustrated in FIG. 2. The combined system is illustrated in FIG. 3.

Figure 3:
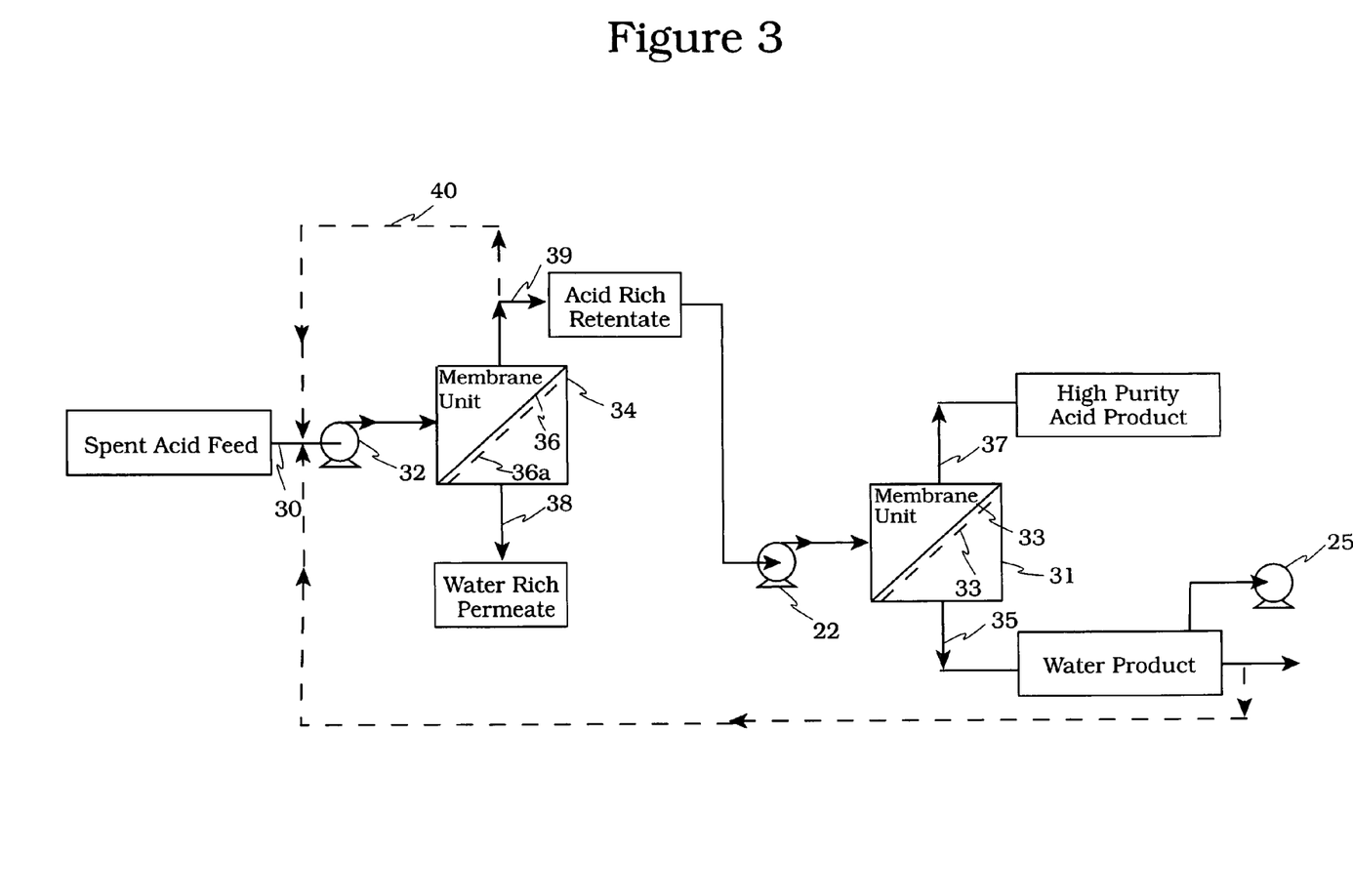

Referring to FIG. 3, the spent acid (30) is fed via pump means (32) to first membrane unit (34) which is an RO or nanofiltration membrane system. Though not illustrated, a preliminary filtration means, such as an additional membrane, may be interposed before membrane unit (34) to remove organic or inorganic contaminants, such as hydrocarbons. Preferred filtration means comprise the acid tolerant membrane systems taught in co-pending application 2005/0173345 published Aug. 11, 2005. Membrane (36) selectively excludes acid as described in respect of FIG. 4, for feed (30) acid concentrations less than about 50 wt % and preferably for feed (30) acid concentrations of less than about 20 wt %. For feed (30) acid concentrations in excess of about 20 wt %, acid permeates the membrane in increasing amounts illustrated in the graph of FIG. 4. This in turn results in water in the retentate (39). Acid purity is further improved by processing retentate to the second membrane unit (31), which is a pervaporation membrane system as described in respect of FIG. 2. The second membrane unit (31) comprises a membrane (33) is selectively permeable to water over the acid. Passing the first retentate (39) through the second membrane unit (31), the membrane (33) produces a second permeate (35) and a second retentate stream (37). The second permeate is water rich acid which can be recycled back to the feed (30). The second retentate stream (37) is high purity acid. Membranes (36) and (33) may be preferably supported by membrane supports (36a) and (33a), respectively.

In the embodiments of FIGS. 1, 2 and 3, the membranes are preferably operated at conditions of temperature and pressure sufficient to maintain the acid in the liquid phase, e.g., temperature in the range of about −10° C. to about 300° C., more preferably from about 0° C. to about 50° C., and most preferably from about 4° C. to about 40° C. Preferably, the RO or nanofiltration membrane is operated from about 100 to about 5000 psig, more preferably from 800 to 1200 psig on the feed side. The pressure on the permeate side is typically atmospheric pressure, but it could be operated at higher pressure so long as the pressure difference across the membrane is sufficient for permeation purposes. The pervaporation membrane is preferably operated in pervaporation mode with the feed pressure typically atmospheric and the permeate side under vacuum. The predominantly water product (35) (permeate) will preferably contain greater than about 95 percent by weight water, and less than about 10 percent sulfuric acid. The high purity acid product (37) (retentate) will preferably contain greater than about 70 percent by weight acid, less than about 10 percent by weight water.

The above preferred embodiments are provided for purposes of illustrating the invention and should not be construed as limiting the scope of the invention as delineated by the following claims.

What is claimed is:

1. A method for recovering sulfuric acid from a feed mixture comprising predominantly sulfuric acid and water, the method comprising:
    processing said feed mixture using a polymeric membrane to form a first retentate containing a greater concentration of acid than said feed mixture and a first permeate containing a greater concentration of water than said feed mixture, said polymeric membrane selectively excluding permeance of acid over the water in the feed mixture and further characterized as a crosslinked polyvinyl alcohol (PVA) membrane having a crosslinking density from about 1.0% to about 25.0% and is crosslinked with a crosslinking agent selected from:
    (a) aliphatic diisocyanate;
    (b) non-aliphatic diisocyanate; and
    (c) mixtures of (a) and (b);
    wherein the processing of said feed mixture using said polymeric membrane is performed under reverse osmosis conditions wherein said feed mixture is at a pressure of about 100 psi to about 5000 psi when contacting said polymeric membrane, and said feed mixture contains less than about 50 percent by weight acid.

2. The method of claim 1 wherein said feed mixture contains less than 25 percent by weight sulfuric acid.

3. The method of claims 1 or 2 wherein the polymeric membrane has a polymeric layer made of a polymer selected from the group consisting of PVA, PVA phosphate, PVA arsenate, PVA selenate, PVA tellurate, PVA nitrate, and PVA borate.

4. The method of claim 1 wherein the membrane crosslinking density ranges from about 2.5% to about 20.0%.

5. The method of claim 4 wherein the membrane crosslinking density ranges from about 5% to about 10%.

6. The method of claim 1 wherein the retentate is further processed with a second membrane that is selectively permeable to water over acid, and collecting the permeance of the second membrane.

* * * * *